United States Patent [19]

French et al.

[11] Patent Number: 4,579,078
[45] Date of Patent: Apr. 1, 1986

[54] SIZING APPLICATOR

[75] Inventors: David W. French; Samuel R. Genson, both of Littleton; Paul R. Van Gunten, Castle Rock, all of Colo.

[73] Assignee: Manville Service Corporation, Denver, Colo.

[21] Appl. No.: 393,004

[22] Filed: Jun. 28, 1982

[51] Int. Cl.$^4$ .............................................. B05C 1/08
[52] U.S. Cl. .................................. 118/234; 118/259; 118/262; 118/DIG. 20
[58] Field of Search ............... 118/234, DIG. 20, 262, 118/259

[56] References Cited

U.S. PATENT DOCUMENTS

| | | | |
|---|---|---|---|
| 2,723,215 | 11/1955 | Biefeld et al. | 118/DIG. 20 |
| 2,898,618 | 8/1959 | Whitfield et al. | 118/259 X |
| 3,552,354 | 1/1971 | Kershaw | 118/234 |
| 3,647,525 | 3/1972 | Dahlgren | 118/262 X |
| 3,828,665 | 8/1974 | Ogura et al. | 118/DIG. 20 |

Primary Examiner—John P. McIntosh
Attorney, Agent, or Firm—John D. Lister; Cornelius P. Quinn; Timothy R. Schulte

[57] ABSTRACT

An applicator for metering a desired amount of a liquid sizing onto moving glass filaments. In a first embodiment, a foam-covered roller is partially immersed in a reservoir of liquid sizing and is in contact with the smooth surfaced applicator roll. The foam-covered roller is driven in the same direction as the applicator roll and a puddle is formed above the roller/roll nip. The pressure exerted by the foam covered roller on the applicator roll and rate of rotation of the applicator roll determine the size of the puddle, which controls the amount of sizing applied to the glass filaments. A second embodiment employs an elastomeric reservoir which sits generally atop the applicator roll. A plurality of slots in the rotationally downstream side of the reservoir dispense the sizing onto the roll with the pressure between the elements and rate of rotation of the applicator roll, again, determining the application rate. The sizing is pumped through a closed loop to keep its temperature and viscosity more uniform.

3 Claims, 4 Drawing Figures

U.S. Patent  Apr. 1, 1986  Sheet 1 of 2  4,579,078
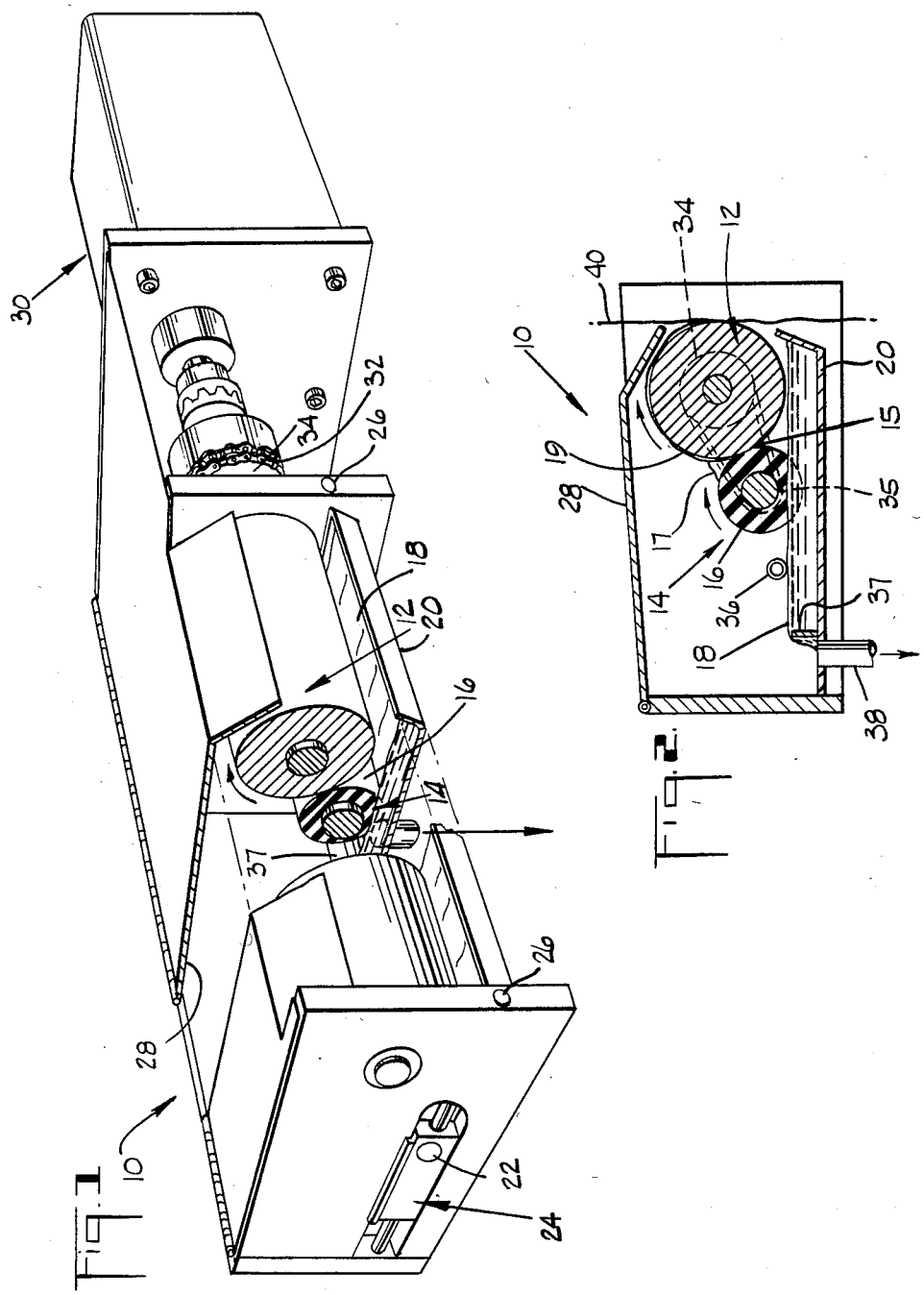

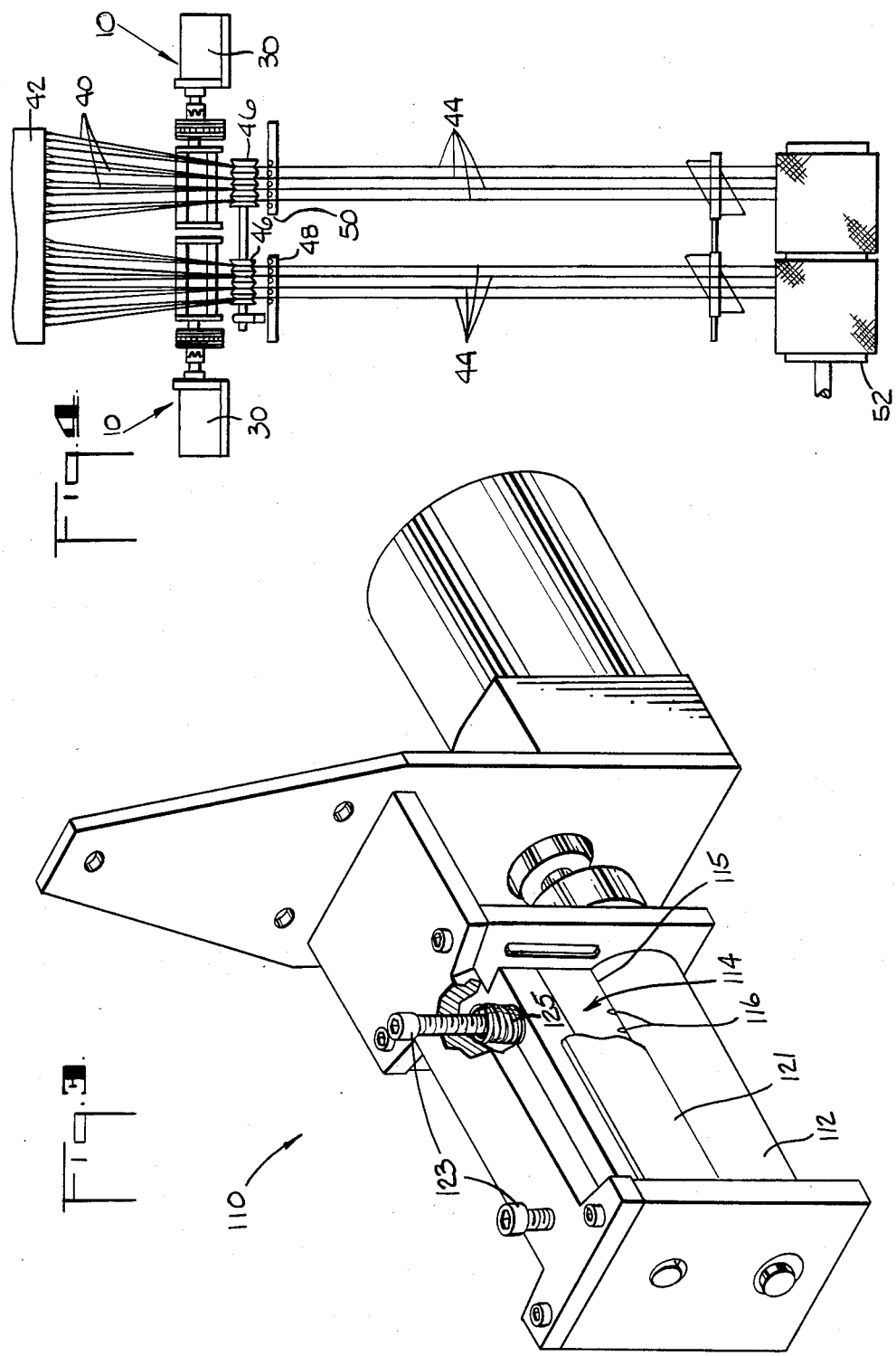

SIZING APPLICATOR

BACKGROUND AND SUMMARY OF THE INVENTION

This invention relates to the formation of continuous glass strands. More particularly, the present invention relates to an applicator for metering sizing onto continuous glass filaments prior to their collection into strands.

A typical strand formation technique is shown in U.S. Pat. No. 3,414,956. Glass filaments are drawn from a tipped bushing, a sizing is applied, the filaments are collected into a plurality of multi-filament strands and then the strands can be (1) wound onto a collection drum as shown in the patent or, (2) pulled and chopped into short segments for use in reinforcing various materials including concrete, paper, glass mat and plastics. The sizing performs an important function: it prevents the filaments from abrading each other due to frictional rubbing in the strands. Such abrasion can reduce the tensile strength of the strands by 50% or more.

Many types of sizing applicators have been developed. The key drawback of most, is that they require rather close watching and adjustment to insure adequate amounts of sizing are applied without unnecessary waste. Some applicators have no adjustment capability and hence are designed to over apply. Because the operators are occupied making sure the filaments are being attenuated properly, they seldom make the necessary adjustments to the applicators that do have such adjustability. To avoid scrapping the production material as a result of too little sizing (which will become apparent from tensile strength tests), most operators will set these sizing applicators for their maximum rate of application, with significant sizing being wasted. Further, the excess sizing results in wetter fiber requiring drainage and drying.

The applicator of the present invention overcomes these difficulties. Its design makes it less susceptible to operational variations. Accordingly, once the applicator has been properly adjusted, little or no further adjustment is necessary. In addition, the applicator of the present invention permits a large range of "proper" adjustments. Therefore, an adequate amount of sizing is applied without resorting to excessive application and waste, producing a dryer fiber.

The sizing applicator of the present invention comprises an applicator roll rotated in the direction of movement of the glass strands at a variable speed, a resilient dispensing means in contact with the applicator roll for metering the sizing thereupon, the combination of the pressure exerted by the dispensing means on the applicator roll and the rate of rotation of the applicator roll controlling the amount of sizing that is applied to the moving glass strands.

In one embodiment of the present invention, the dispensing means comprises a second roller which is covered with a foam or sponge layer. This roller is rotated in the same rotational direction as the applicator roll and the rate of rotation of the applicator roll and pressure exerted by the foam-covered dispensing roller on the applicator roll, determine the size of a puddle of sizing formed in the nip between the roller and the roll which, in turn, determines the amount of sizing applied.

In an alternative embodiment, the resilient dispensing means is a generally rectangular reservoir of urethane or the like, which sits generally atop the applicator roll. The surface which contacts the applicator has a plurality of metering slots therein. By adjusting the pressure exerted by the reservoir on the applicator roll, the width of the slots and the amount of sizing exiting therefrom can be controlled.

In both embodiments, excess sizing is pumped through a closed loop in order that the temperature and viscosity of the fluid may be more closely controlled. This enables the amount of sizing applied to the glass to be more closely metered than would otherwise be possible.

Other features, advantages and characteristics of the present invention will become apparent after a reading of the following specification in conjunction with the accompanying drawings.

BRIEF DESCRIPTION OF THE DRAWINGS

FIG. 1 is a perspective view of a preferred embodiment of the present invention with parts broken away for clarity;

FIG. 2 is a cross-sectional side view taken from the point of the breakaway in FIG. 1 looking toward the motor;

FIG. 3 is a perspective view of a second embodiment; and

FIG. 4 is a schematic side view of the environment in which the sizing applicator of the present invention is used.

DETAILED DESCRIPTION OF PREFERRED EMBODIMENTS

The preferred embodiment of the sizing applicator of the present invention is shown in FIGS. 1 and 2 generally at 10. Applicator roll 12 may be made of ceramic or stainless steel coated with TEFLON ® or a filled TEFLON ®-like polymer but is preferably formed of carbon bronze. Resilient dispensing means in the form of roller 14 with a foam covering 16 contacts the applicator roll and meters the amount of liquid sizing 18 which is withdrawn from reservoir 20 and transferred to applicator roll 12 in a manner to be described hereafter.

Each end of roller shaft 22 of roller 14 is mounted in a slide bearing 24. The amount of pressure exerted by roller 14 on roll 12 can be adjusted by rotation of threaded rods 26 which move slide bearings 24 toward or away from stationary roll 12. Hinged cover 28 extends over roll 12, roller 14 and reservoir 20 protecting them from contamination from foreign matter including molten glass.

Motor 30 directly drives roll 12 in a clockwise direction (as seen in FIGS. 1 and 2) which corresponds to the downward direction of glass fibers 40 being drawn from bushing 42 (FIG. 4). A chain 32 engages a first sprocket 34 attached to the shaft of roll 12 and a second sprocket 35 attached to the shaft or roller 14. Accordingly, roller 14 is driven in the same rotational direction as applicator roll 12. Obviously, an alternative drive connection, such as a gear drive train including an intermediate reversing gear, could be used.

The effects of such a drive are best seen in FIG. 2. In many sizing applicators, only one of the two elements is directly driven, with either the roller or roll being frictionally driven by the directly driven element. There are two problems with such a drive: the liquid is brought to the side of the roller/roll nip on the downstream side of the applicator so that rather than metering an even coating onto the applicator roll, the nip squeezes the liquid off the applicator roll and causes it to run ineffectively back into the reservoir; and, both roller and roll rotate away from the nip attempting to move the liquid in opposing directions.

In contrast, foam covered roller 14 adsorbs the sizing 18 from reservoir 20 and lifts it toward the applicator roll 12. As the sizing is brought into the nip 15 between roller 14 and roll 12 (FIG. 2), the sizing is squeezed from foam layer 16 forming a puddle 17 which is suspended by the roller 14 and roll 12. This puddle 17 forms a miniature reservoir which is in direct contact with applicator roll 12. As roll 12 rotates, a thin film 19 is formed thereon by puddle 17 for application to glass filaments 40. The size of puddle 17 and, hence, the thickness of film 19, is determined by the pressure exerted by roller 14 on applicator roll 12 (i.e., the amount of compression of foam layer 16) and the rate of rotation of applicator roll 12 (i.e., is the force of adhesion between sizing 18 and roll 12 sufficient for the particular rotational velocity to overcome the gravitational pull and cohesiveness of puddle 17).

The level of the sizing 18 in reservoir 20 is maintained by input tube 36 and weir 37. Sizing is pumped into reservoir 20 at a rate which is more than sufficient to resupply what is applied to the glass. The excess pours over weir 37 and flows out overflow drain 38 and is recycled. By pumping the sizing through a closed loop, the temperature and viscosity of the sizing is maintained more uniform, which produces a more uniform coating on the applicator roll 12. For a sizing whose viscosity is maintained generally uniform, the pressure at nip 15 and rate of rotation of roll 12 need not be varied so often. Changes can be limited to accommodating for wear or changing the type of sizing for different production runs. With regard to the former, it should be noted that after three months of substantially continuous usage, the foam covered roller showed no traces of wear.

FIG. 3 depicts a second embodiment of the present invention generally at 110. Applicator roll 112 has resilient dispensing means in contact therewith, in the form of a generally rectangularly cross-sectioned reservoir 114. Preferably, the reservoir 114 is made of an elastomeric material such as urethane with the surface 115 which contacts roll 112 being molded to conform and seal therewith. Sealing surface 115 has a plurality of slots 116 (preferably five or more) along its length, said slots opening only to the glass filament side. A stainless steel plate 121 extends across the applicator 110 and shields the reservoir from contact from the glass strands. Sizing is pumped through the reservoir 114 by means not shown in a closed circuit in order to maintain temperature and viscosity of the sizing as with the previous embodiment. Pressure adjustment screws 123 and compression springs 125 control the force exerted by the reservoir 114 on applicator roll 112 which, in turn, controls the width of slots 116 and the amount of sizing released therefrom. As with the previous embodiment, the rate of rotation of applicator 112 is a factor in determining the application rate of sizing to the glass filaments.

The environment in which the sizing applicator of the present invention is used is depicted schematically in FIG. 4. Glass filaments 40 are drawn from a molten glass bath held in bushing 42. These filaments are drawn past first and second applicators 10, 10' where liquid sizing is applied to each filament in the manner previously described. The applicators 10, 10' are mounted on first and second pivot posts (not shown) which permit them to be easily moved out of contact with the glass for servicing or replacement. The filaments are then gathered into a plurality of strands 44 by grooved rollers 46. These strands may contain between 50 and 200 filaments and are maintained in spaced relationship by guides 48 and 50, then wound onto a drum 52 into two side-by-side windings. Alternatively, the strands could be fed to one or more chopper rolls and cut into short lengths for use as reinforcement for such materials as concrete, paper, glass mat and plastic.

The two embodiments of the sizing applicator of the present invention employ the same operational concepts. Each has a resilient dispensing means contacting a driven applicator roll. Each controls the amount of sizing applied to the glass filaments by adjusting of two operational variables: the pressure exerted by the resilient dispensing means on the applicator roll and the speed of rotation of the applicator roll. Lastly, each pumps the sizing through a closed loop in order to keep the temperature and viscosity and, hence, rate of sizing application more uniform. Sizing usage with the present system has been reduced to 1½ gallons per hour per applicator from the 6 gallons per hour per applicator of the system it replaces without detrimentally affecting the glass. In addition, the applicator of the present invention can be manufactured for about one-sixth the cost of the applicator it replaces. Lastly, by eliminating over-application of sizing, a drier processed strand is produced reducing the energy needed to remove excess moisture.

Various changes, modifications, and alternatives will become apparent following a reading of the foregoing specification. Accordingly, it is intended that all such changes, modifications and alternatives as come within the scope of the appended claims be considered part of the present invention.

We claim:

1. An applicator for applying a desired amount of a liquid sizing to moving strands such as glass filaments or the like, comprising:
   an applicator roll:
   means to rotationally drive said applicator roll in the direction of movement of the strands at a variable fixed rate of rotation;
   resilient deformable dispensing means including a generally rectangular stationary member contacting said applicator roll with one of its surfaces, said one surface conforming to the surface of said applicator roll to fit and seal thereagainst;
   a plurality of slits in at least one side surface of said generally stationary member adjacent the point of contact between said resilient dispensing means and said applicator roll;
   mounting means permitting the pressure exerted by said resilient dispensing means against said applicator roll to be varied to change the amount said slits are open, the pressure exerted by said resilient dispensing means against, and the rate of rotation of, said applicator roll determining the amount of said sizing applied to the moving strands.

2. The sizing applicator of claim 1 wherein the resilient dispensing means is made of an elastomeric material such as urethane.

3. The sizing applicator of claim 1 including means to pump a quantity of the liquid sizing through a closed circuit said circuit including said resilient dispensing means.

* * * * *